T. J. STURTEVANT.
ELEVATOR.
APPLICATION FILED SEPT. 3, 1920.

1,391,704.

Patented Sept. 27, 1921.
4 SHEETS—SHEET 1.

Inventor
Thomas J. Sturtevant
by Robt. P. Harris
Attorney

T. J. STURTEVANT.
ELEVATOR.
APPLICATION FILED SEPT. 3, 1920.

1,391,704.

Patented Sept. 27, 1921.
4 SHEETS—SHEET 2.

T. J. STURTEVANT.
ELEVATOR.
APPLICATION FILED SEPT. 3, 1920.
1,391,704.
Patented Sept. 27, 1921.
4 SHEETS—SHEET 3.
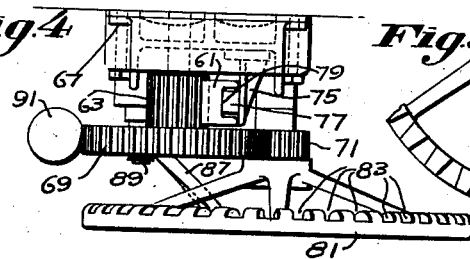
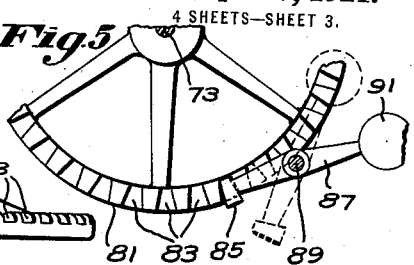
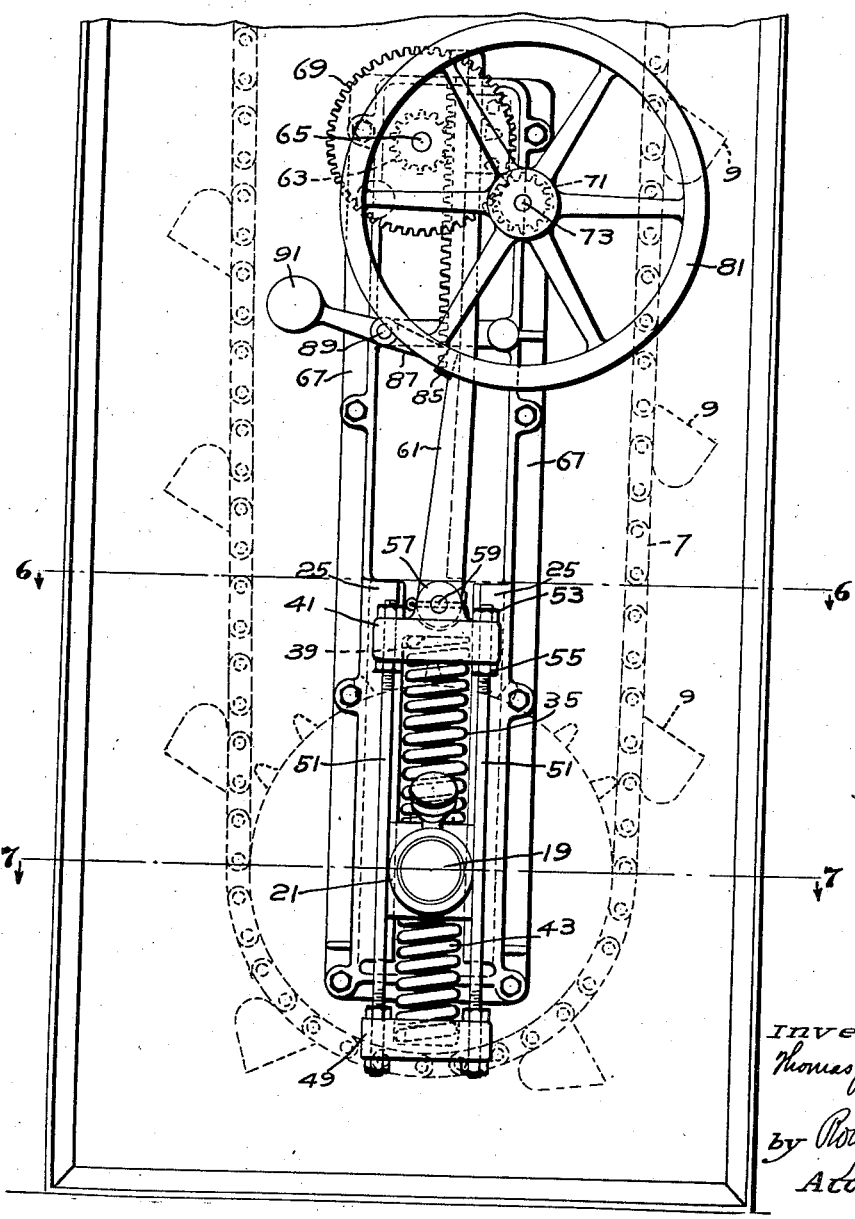

T. J. STURTEVANT.
ELEVATOR.
APPLICATION FILED SEPT. 3, 1920.

1,391,704.

Patented Sept. 27, 1921.
4 SHEETS—SHEET 4.

Inventor
Thomas J. Sturtevant
by Robt. P. Hains
Attorney

UNITED STATES PATENT OFFICE.

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS.

ELEVATOR.

1,391,704.　　　　　Specification of Letters Patent.　　Patented Sept. 27, 1921.

Application filed September 3, 1920. Serial No. 408,004.

*To all whom it may concern:*

Be it known that I, THOMAS J. STURTEVANT, a citizen of the United States, residing at Wellesley, in the county of Norfolk and State of Massachusetts, have invented an Improvement in Elevators, of which the following description, in connection with the accompanying drawings, is a specification, like characters on the drawings representing like parts.

The invention to be hereinafter described relates to belts for bucket conveyers and other purposes.

The buckets are mounted on an endless belt, usually in the form of a sprocket chain connecting upper and lower sprocket wheels. In practice, it is found that more or less material is spilled from the buckets and gravitates downward onto the lower wheel and in between said wheel and the sprocket chain. This exerts a strain on the chain, and is liable to break the same.

One of the purposes of the present invention, therefore, is to provide one of the sprocket wheels with spring supported bearings, the construction being such that the sprocket chain will be held with proper tension, but in case material works in between the sprocket wheel and chain so as to tend to strain or break the latter, the bearings may move against the tension of the springs and prevent such occurrence.

It is necessary to adjust one of the sprocket wheels from time to time, in order to permit a worn sprocket chain, or one requiring repair, to be removed, and to permit the same to be readily returned into operative position on the sprocket wheels. Another purpose of the invention, therefore, is to provide simple and efficient means for adjusting the bearings of the shaft of one of the sprocket wheels and having provision to permit the bearings to yield under the conditions above referred to.

With the aforesaid and other purposes in view, the character of the invention will be best understood by reference to the following description of one good form of the invention shown in the accompanying drawings, wherein:

Figure 1 is an elevation of an elevator equipped with means for yieldingly supporting the bearings of the shaft of one of the sprocket wheels of a bucket conveyer embodying the invention;

Fig. 2 on an enlarged scale is an end elevation of the boot of the elevator, portions of the bearing supporting means being shown in section;

Fig. 3 on an enlarged scale is a side elevation of a portion of the boot showing the bearing adjusting device located at one side of the boot;

Fig. 4 is a plan of a portion of the belt adjusting device;

Fig. 5 is a detail of the locking means for the belt adjusting device;

Figure 1:
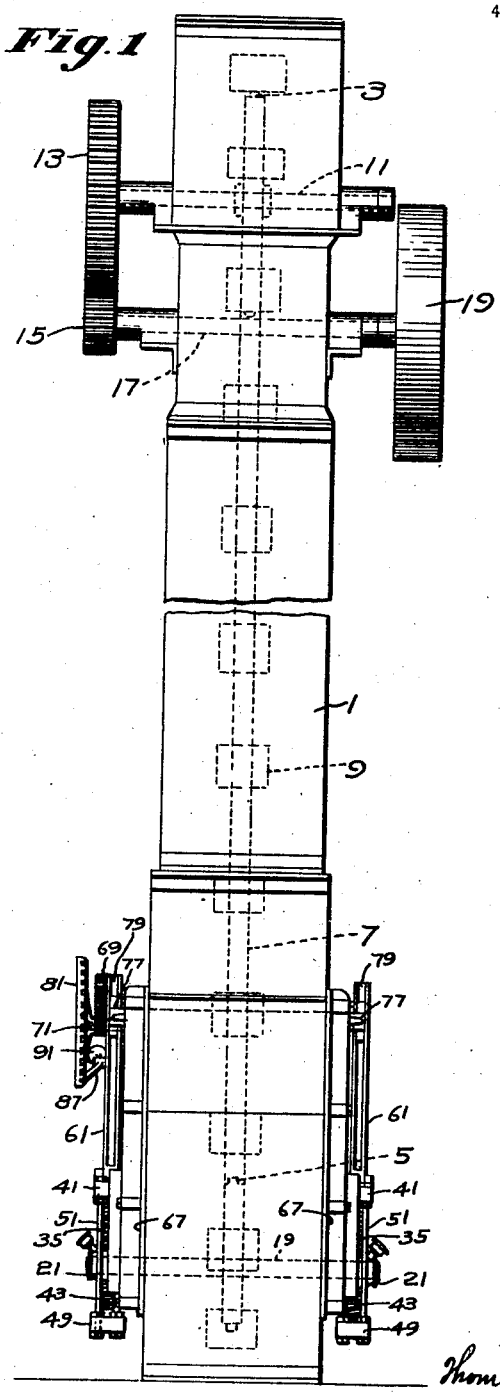
Figure 2:
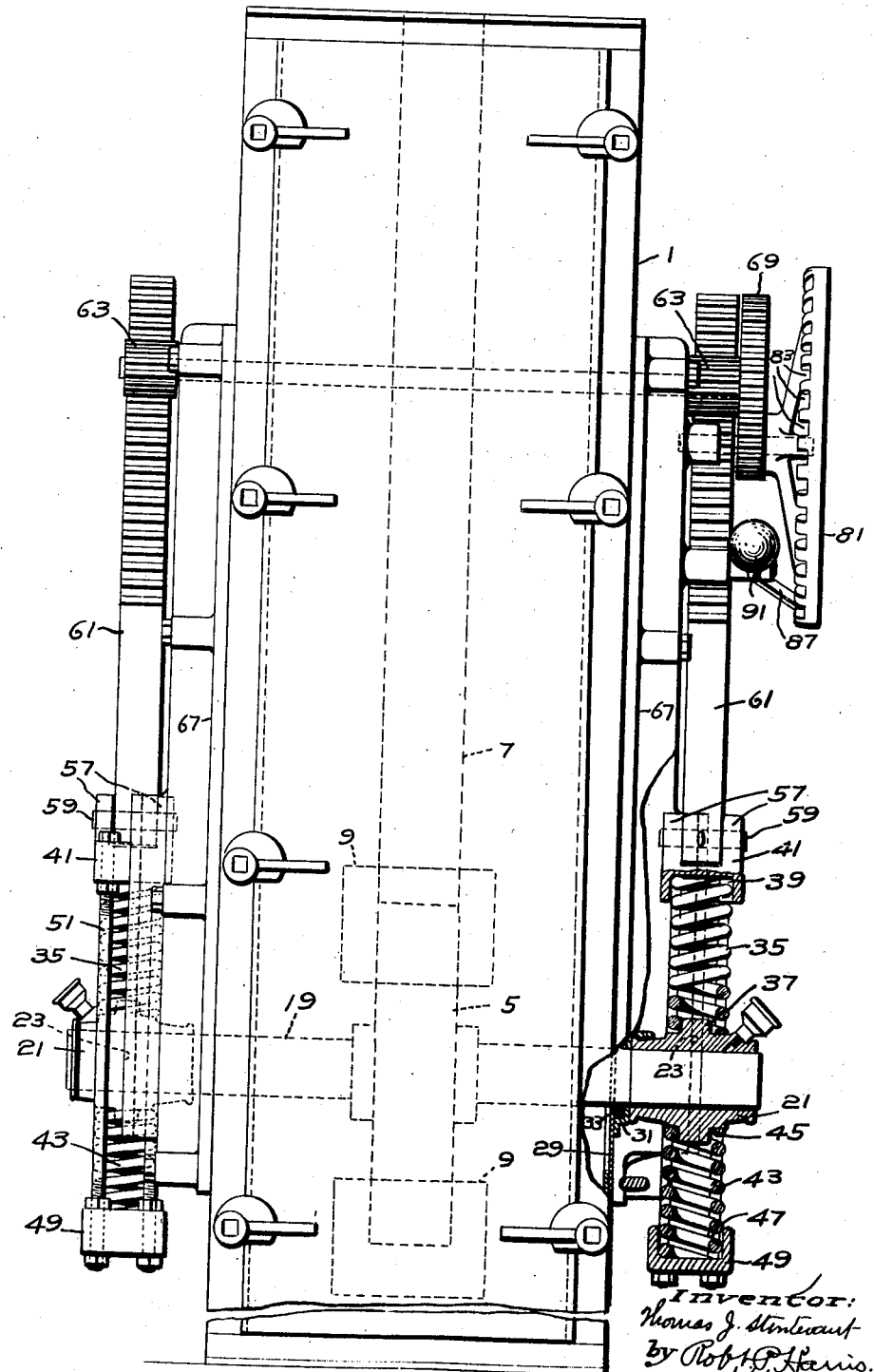

Referring to the drawings, 1 designates a casing of an elevator containing an upper sprocket wheel 3 and a lower sprocket wheel 5 connected by a sprocket chain 7 having buckets 9 attached thereto at intervals. The upper sprocket wheel 3 is mounted on a shaft 11 having a gear 13 on one end thereof meshing with a pinion 15 on a shaft 17 provided with a pulley 18 adapted to be driven from any suitable source of power.

The lower sprocket wheel is mounted on a shaft 19 journaled in boxes 21. Each of these boxes is provided with opposed grooves 23 adapted to slide along vertical guides 25 bolted to opposed sides of the boot of the casing.

Figure 6:
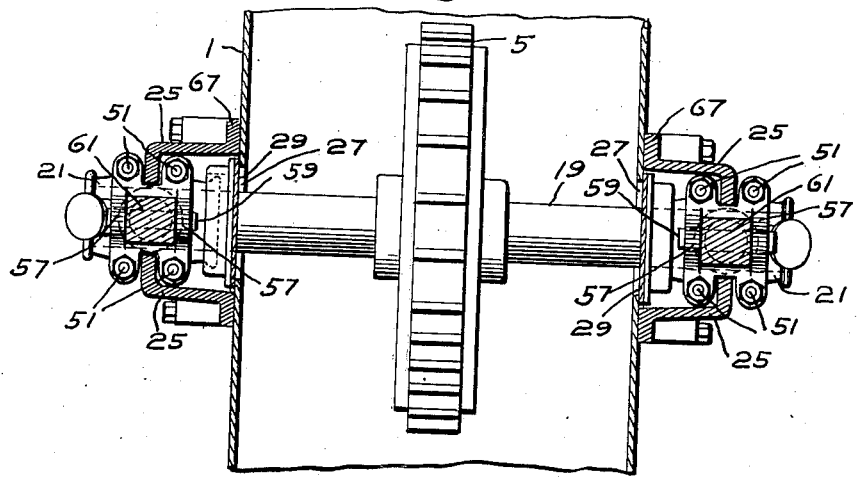
Fig. 6 is a horizontal section taken on line 6—6 of Fig. 3.
Figure 7:
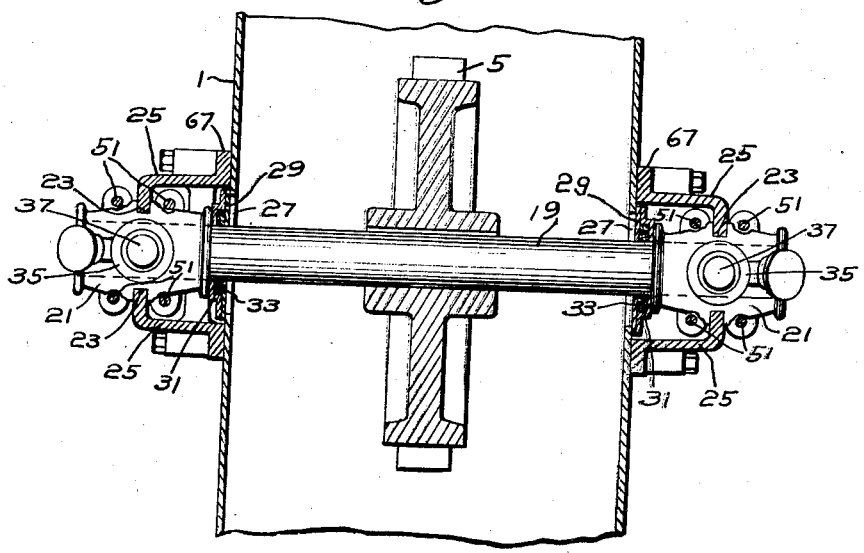
Fig. 7 is a horizontal section taken on line 7—7 of Fig. 3.

The shaft 19 projects through elongated openings (Figs. 6 and 7) in the opposed sides of the casing, of sufficient length to permit the extent of vertical adjustment of the shaft required. To prevent escape of material through these openings, cover plates 29 are provided fitted between the guides 25 and apertured to receive the shaft 19. Caps 31 may be mounted on the shaft and connected to the cover plates 29. Between the caps and plates, packing material 33 may be provided to prevent escape of material between the shaft and the openings in the cover plates.

Suitable means may be provided yieldingly to hold the shaft boxes in proper position. This means, in the present instance of the invention, comprises upper springs 35 having lower ends engaging seats 37 on the boxes, and upper ends mounted in sockets 39 in heads 41.

Beneath the boxes are coil springs 43 having their upper ends engaging seats 45 on the under sides of the boxes. The lower ends of the springs are mounted in sockets 47 in heads 49. These heads may be suitably formed to permit them to slide between the guides 25, as will be noted in Figs. 6 and 7.

The heads 41 and 49 for each of the boxes may be connected by four rods 51 having ends threaded to receive nuts 53 and 55. The construction is such that the nuts may be adjusted relatively to move the heads to give the coil springs 35 and 43 the tension desired. The upper spring 35 preferably is made longer than the lower spring 43, in order that it shall be more yieldable for a purpose to be described.

The upper heads 41 may be provided with ears 57 receiving pins 59. Rack bars 61 are connected to these pins and engage pinions 63 fast on a shaft 65 journaled in bearings carried by members 67 forming continuations of the frame from each of the guides 25.

Also fast on the shaft 65 is a gear 69 meshing with a pinion 71 on a stub shaft 73 journaled in a bearing mounted on one of the frame members 67. To hold the racks in engagement with the pinion 63, brackets 75 may be mounted on the frames at opposite sides of the boot, and may have projections 77 extending into grooves 79 in the backs of the rack bars.

A hand wheel 81 may be mounted fast on the shaft 73, and have a series of notches 83 on one face thereof. Coöperating with these notches is a lock dog 85 on a lever 87 pivotally mounted on a pin 89 on one of the frames. A weight 91 is provided on the opposite end of the lever from the dog 85, and tends to rock the lever in a direction to hold the dog 85 in one of the notches 83.

When it is desired to adjust the lower sprocket wheel, the lock dog 85 is released from the hand wheel, and the latter is rotated. This will cause the pinion 71, gear 69 and pinions 63 to rotate. The latter in turn will move the rack bars. Since the bars are connected to the heads, between which the boxes are yieldingly supported, the boxes will slide along their guides either upward or downward according to the direction of rotation of the hand wheel. When the boxes are given the adjustment desired, the lock dog is allowed to rock into engagement with one of the notches on the hand wheel.

In case materials work in between the lower sprocket wheel and the chain, the upper coil springs 35 will yield and allow the shaft boxes to move upward somewhat. As a consequence, danger of straining or breaking the sprocket chain from such cause is avoided.

In the course of the rotation of the sprocket wheel, the material which works in between the same and the sprocket chain may escape therefrom. If the downward movement of the boxes were positively limited by abutments, on escape of the materials the coil springs 35 would snap the boxes down against such abutments with probable injury to the construction. The lower coil springs 43 will yieldingly oppose or cushion such return movement of the boxes, and effectively prevent injurious shock thereto. Since the lower springs are shorter than the upper springs, they are stiffer, but yet are sufficiently yielding to absorb the shock of the return movements of the shaft boxes.

The train of gearing for transmitting the motion from the hand wheel to the rack bars affords mechanical advantage enabling the shaft boxes to be easily adjusted with little effort. The sprocket wheel shaft adjusting means is simple, strong and efficient in construction, and the yielding means for holding the boxes in position desirably prolongs the life of the sprocket chains.

It will be understood that the invention is not limited to the specific embodiment shown, and that various deviations may be made therefrom without departing from the spirit and scope of the appended claims.

What is claimed is:—

1. In an apparatus of the character described, the combination of a pair of wheels, a belt connecting the wheels, shafts for said wheels, boxes for one of said shafts, carriers having the boxes mounted thereupon for movement relative thereto, spring means for yieldingly resisting movement of each box in opposite directions upon its carrier, means for movably supporting the carriers, and means for adjusting the carriers to adjust the boxes and thereby adjust one of the wheels relatively to the other.

2. In an apparatus of the character described, the combination of a pair of wheels, a belt connecting the wheels, shafts for said wheels, boxes for one of said shafts, carriers having the boxes mounted thereupon for movement relative thereto, springs upon the carriers at opposite sides of the boxes to yieldingly resist movement of the boxes upon the carriers, means for movably supporting the carriers, and means for adjusting the carrier to adjust the boxes and thereby adjust one of the wheels relatively to the other.

3. In an apparatus of the character described, the combination of a pair of wheels, a belt connecting said wheels, a shaft for one of the wheels, boxes for said shaft, carriers for said boxes, each comprising a pair of heads, means connecting said heads, springs confined between the boxes and said heads, guides for said carriers, and means connected to said carriers for adjusting the same along said guides.

4. An apparatus of the character described, comprising a pair of wheels, a belt connecting said wheels, a shaft for one of the wheels, boxes for said shaft, carriers for said boxes, each comprising a pair of heads, rods connecting said heads, springs confined between said boxes and heads, and means operating through said carriers for adjusting said boxes to move one of said wheels relatively to the other.

5. In an apparatus of the character described, the combination of a pair of wheels, a belt connecting said wheels, a shaft for one of the wheels, boxes for said shaft, carriers having the boxes slidably mounted thereupon to permit one wheel to move toward the other wheel when material works between one of the wheels and the belt, means upon the carriers acting upon the boxes to yieldingly check the movement of the shaft and its wheel away from the other wheel to prevent shock on the wheel and belt when the material escapes from between the wheel and belt, and means for adjusting the carriers to adjust one wheel relatively to the other.

6. In an apparatus of the character described, the combination of a pair of wheels, a belt connecting said wheels, a shaft for one of the wheels, boxes for said shaft, carriers provided with spaced heads and having the boxes movably mounted between the spaced heads, springs confined between said boxes and spaced heads to yieldingly hold the boxes in spaced relation to the heads, means relatively to adjust the heads to vary the adjustment of the springs, and means for adjusting the carriers to adjust one wheel relatively to the other.

7. In an apparatus of the character described, the combination of a pair of wheels, a belt connecting said wheels, a shaft for one of the wheels, boxes for said shaft, guides for said boxes, carriers for said boxes, rack bars connected to said carriers, pinions meshing with said racks, a shaft for said pinions, a gear fast on said shaft, a pinion meshing with said gear, a shaft for said pinion, a hand wheel on the latter shaft, and means for locking the hand wheel in different positions of adjustment.

8. In an apparatus of the character described, the combination of a pair of wheels, a belt connecting said wheels, a shaft for one of the wheels, boxes for said shaft, carriers for said boxes and having the boxes movably secured thereto, springs coöperating with said boxes and carriers to allow yielding movement of the boxes upon their carriers and thereby permit movement of one of the wheels toward the other when material works in between one of the wheels and the belt, springs coöperating with said boxes and carriers to prevent shock on the parts when the wheel returns to normal position, and means for adjusting the carriers.

9. In an apparatus of the character described, the combination of a pair of wheels, a belt connecting the wheels, a shaft for one of the wheels, journal boxes for the shaft, carriers having the boxes movably mounted thereupon, and means simultaneously and equally to adjust said boxes including a pair of rack bars secured to the carriers, pinions meshing with the rack bars, a shaft for said pinions, a hand wheel for rotating the shaft, and a locking device adapted to automatically lock the adjusting means in position; and spring means for yieldingly holding the boxes in position upon the carriers to allow one of the wheels to move toward the other when material works in between one of the wheels and the belt.

10. In an elevator, the combination of upper and lower wheels, a chain connecting said wheels and having buckets thereon, a shaft for the lower wheel, boxes for said shaft, carriers for said boxes having spaced heads, springs between the boxes and heads for yieldingly supporting the boxes in spaced relation to the heads, means for adjusting the tension of said springs, guide means for said carriers, and means for adjusting the carriers and for supporting them in different positions of adjustment.

11. In an apparatus of the character described, the combination of a pair of wheels, a belt connecting the wheels, a shaft for one of the wheels, boxes for said shaft, carriers for the boxes each consisting of a pair of spaced heads, and rods adjustably connecting the heads and spaced to slidably receive a box between them; springs confined between the boxes and each head of the carriers to yieldingly support the shaft, and means for adjusting the carriers to adjust the boxes and thereby adjust one of the wheels relatively to the other.

In testimony whereof, I have signed my name to this specification.

THOMAS J. STURTEVANT.